United States Patent [19]

Nagumo et al.

[11] 4,426,664

[45] Jan. 17, 1984

[54] SOLID STATE IMAGE SENSOR

[75] Inventors: Fumio Nagumo, Atsugi; Kaneyoshi Takeshita, Tokyo, both of Japan

[73] Assignee: Sony Corporation, Tokyo, Japan

[21] Appl. No.: 368,451

[22] Filed: Apr. 14, 1982

[30] Foreign Application Priority Data

Apr. 27, 1981 [JP] Japan ............................. 56-63704

[51] Int. Cl.³ ............................................. H04N 3/14
[52] U.S. Cl. ................................................... 358/213
[58] Field of Search ........................................ 358/213

[56] References Cited

U.S. PATENT DOCUMENTS 4,353,084 10/1982 Herbst et al. .................... 358/44

Primary Examiner—Richard Murray
Attorney, Agent, or Firm—Hill, Van Santen, Steadman & Simpson

[57] ABSTRACT

The present invention is directed to a solid state image sensor comprising a charge transfer device such as a charge coupled device (CCD), wherein an improved arrangement of transfer electrodes is provided for the charge transfer device therein and the number of effective sensing elements for performing practically the image sensing operation can be altered in accordance with the manner of supplying a driving signal to the transfer electrodes, so that either one of different television signals, for example, color television signals according to the NTSC system and the PAL or SECAM system, can be selectively produced thereby.

3 Claims, 1 Drawing Figure

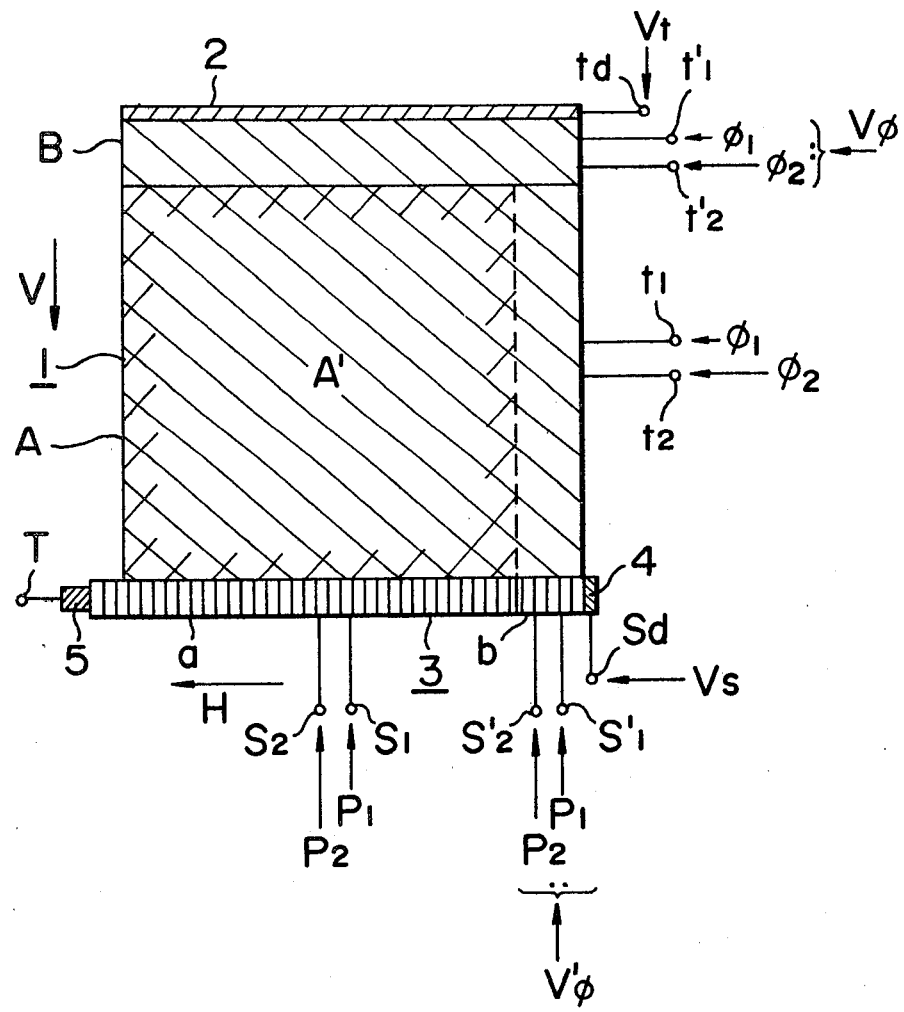

SOLID STATE IMAGE SENSOR

BACKGROUND OF THE INVENTION

This invention relates generally to an image sensor comprising a charge transfer device such as a charge coupled device (hereinafter referred to as CCD), and more particularly to a solid state image sensor comprising the charge transfer device in which transfer electrodes for the charge transfer device are improved in construction so that the number of effective sensing elements can be altered in accordance with the manner of supplying a driving signal to the transfer electrodes.

Research and development for a solid state image sensor which comprises a charge transfer device, especially, the CCD have progressed very fast and several compact television cameras employing such a solid state image sensor have been proposed for producing not only a monochromatic television signal but also a color television signal. For the color television systems, the NTSC system, the PAL system and the SECAM system have been put into practical service at the present. The NTSC, PAL and SECAM systems are based on different technical concepts, respectively, and each of them have a different number of horizontal scanning lines forming a frame picture. In the NTSC system, one frame period consists of 525 line periods and one frame picture is formed with a video signal obtained in about 485 line periods among the 525 line periods except the line periods in two vertical blanking periods therein, in other words, one frame picture is formed with about 485 horizontal scanning lines. While, in the case of the PAL or SECAM system, one frame period consists of 625 line periods and one frame picture is formed with a video signal obtained in about 570 line periods among the 625 line periods except the line periods in two vertical blanking periods therein, in other words, one frame picture is formed with about 570 horizontal scanning lines.

Each of the previously proposed color television cameras for producing the color television signal according to the NTSC, PAL or SECAM system which employ the solid state image sensor, requires a separate solid state image sensor designed specifically for the NTSC, PAL or SECAM system. The reason of this is that in the solid state image sensor comprising, for example, the CCD, each cell for storing and transferring a signal charge in the CCD forms a sensing element and the number of rows of such sensing elements for performing the charge transfer in the vertical direction determines the number of the horizontal scanning lines forming one frame picture in an output video signal, and further the number of the sensing elements making each of the rows, that is, the number of the sensing elements in the horizontal direction determines the definition in each horizontal scanning line, and therefore it is necessary for obtaining the color television signal according to the NTSC, PAL or SECAM system as an output video signal to use the solid state image sensor having the rows of sensing elements for performing a number of charge transfers in the vertical direction which is the same as the number of the horizontal scanning lines forming one frame picture in the respective system, that is, about 485 rows for the NTSC system or about 570 rows for the PAL or SECAM system. Incidentally, since the image sensing operation is performed field by field in general, the number of the rows of sensor elements arranged in the vertical direction which become operative at the same time corresponds with one half of the number of the horizontal scanning lines forming one frame picture. Further for the additional reason that the ratio of the vertical size to the horizontal size in a picture displayed on a television receiver is generally determined at 3:4, and therefore it is required to select the number of the sensing elements making each of the rows arranged in the vertical direction in response to the number of the rows of sensing elements in order to obtain the definition which will remain constant in the horizontal direction. Consequently, the solid state image sensor used for the PAL or SECAM system is required to have a number of the rows of sensing elements for performing the charge transfer in a vertical direction and the number of the sensing elements which form each of the rows which are greater than the corresponding ones used in the solid state image sensor for the NTSC system, respectively.

However, with a solid state image sensor in which the number of effective sensing elements which are operative to perform the image sensing which can be altered as occasion demands, it will be possible to use it for each system for obtaining the color television signals according to the NTSC, PAL and SECAM systems and this will result in great convenience. In view of this desire, a novel solid state image sensor is proposed in the present invention.

SUMMARY OF THE INVENTION

It is an object of the present invention to provide a solid state image sensor comprising a charge transfer device wherein the number of effective sensing elements can be altered as occasion demands.

Another object of the present invention is to provide a solid state image sensor comprising a charge transfer device wherein the transfer electrodes for the charge transfer device are improved in construction so that the number of effective sensing elements can be altered in accordance with the manner of supplying a driving signal to the transfer electrodes.

A further object of the present invention is to provide a solid state image sensor comprising a charge transfer device which can be used for producing either one of different television signals.

A still further object of the present invention is to provide a solid state image sensor comprising a charge transfer device which can be employed in either a television camera for producing a color television signal according to the NTSC system or a television camera for producing a color television signal according to the PAL or SECAM system.

Other objects, advantages and features of the present invention will become apparent from the following description taken in conjunction with the accompanying drawing.

BRIEF DESCRIPTION OF THE DRAWING

The FIGURE is a schematic illustration showing one embodiment of solid state image sensor according to the present invention.

DESCRIPTION OF THE PREFERRED EMBODIMENT

The FIGURE in the accompanying drawing shows an example of a solid state image sensor according to the present invention and this example is formed into a solid state image sensor of the interline transfer type comprising a 2-phase CCD to which the novel concept of the present invention is applied. In the FIGURE, 1 indicates a sensing element forming portion wherein a large number of photo-sensing areas and a large number of charge storing and transferring areas are provided to form a large number of sensing elements. These sensing elements are formed into a plurality of rows arranged in the vertical direction (the direction to the lower side from the upper side on the FIGURE). On the sensing element forming portion 1, vertical transfer electrodes are provided for performing the transfer of the charge produced and stored in each row of sensing elements, which is arranged in the sensing element forming portion 1, in the vertical direction (the direction indicated by an arrow V in the FIGURE) and these vertical transfer electrodes are divided into two groups, namely, a first group A and a second group B arranged in the direction of the charge transfer. Terminals $t_1$ and $t_2$ are connected to the first group A of the vertical transfer electrodes are supplied with 2-phase driving signals. Terminals $t'_1$ and $t'_2$ are connected to the second group B of the vertical transfer electrodes and are supplied with the 2-phase driving signals.

An overflow drain or a diffusion layer in which an impurity is diffused at high density in a semiconductor substrate, is indicated by 2 and is operative to be a charge absorbing portion, is formed at one end of the sensing element forming portion 1 where the second group B of the vertical transfer electrodes are positioned and a terminal $t_d$ is connected thereto and is supplied with a predetermined voltage. Further, a line transfer portion 3 is provided at the other end of the sensing element forming portion 1 on the side opposite to the overflow drain or the diffusion layer 2. Horizontal transfer electrodes are provided on the line transfer portion 3 for performing the transfer of the charges, which are produced in each row of sensing elements and the charges are transferred row by row to the line transfer portion 3 from the sensing element forming portion 1, in the horizontal direction (the direction indicated by an arrow H in the FIGURE) and are divided into two groups, namely, a first group a and a second group b arranged in the direction of the charge transfer. Terminals $S_1$ and $S_2$ are connected to the first group a of the horizontal transfer electrodes and are supplied with 2-phase driving signals. Terminals $S'_1$ and $S'_2$ are also connected to the second group b of the horizontal transfer electrodes and are supplied with the 2-phase driving signals. A diffusion layer 4 which is operative to be a charge absorbing portion is formed at one end of the line transfer portion 3 on the side of the second group b of the horizontal transfer electrodes and a terminal $S_d$ is provided thereto and is supplied with a predetermined voltage. An output portion 5 is formed at the other end of the line transfer portion 33 on the side opposite to the difusion layer 4 and an output terminal T is connected thereto.

One example of the solid state image sensor according to the present invention is composed as explained above. With such a device, in a first case, 2-phase driving signals $\phi_1$ and $\phi_2$ are supplied in common to the terminals $t_1$ and $t_2$ connected to the first group A of the vertical transfer electrodes and the terminals $t'_1$ and $t'_2$ connected to the second group B of the vertical transfer electrodes and another 2-phase driving signals $P_1$ and $P_2$ are supplied in common to the terminals $S_1$ and $S_2$ connected to the first group a of the horizontal transfer electrodes and the terminals $S'_1$ and $S'_2$ connected to the second group b of the horizontal transfer electrodes, and the image sensing operation is conducted under such conditions. In this case, a signal charge produced in each of the sensing elements due to receiving the light applied to the sensing element forming portion 1 is transferred in the vertical direction toward the line transfer portion 3 as indicated by the arrow V by both of the first and second groups A and B of the vertical transfer electrodes provided on the sensing element forming portion 1 and the charges are then transferred in the horizontal direction toward the output portion 5 as indicated by the arrow H by both of the first and second groups a and b of the horizontal transfer electrodes provided on the line transfer portion 3 so that an output video signal is derived from the output terminal T. In this first case, all sensing elements formed in the sensing element forming portion 1 are operative and effective sensing elements.

While, in a second case, the 2-phase driving signals $\phi_1$ and $\phi_2$ are supplied only to the terminals $t_1$ and $t_2$ connected to the first group A of the vertical transfer electrodes and a DC bias voltage $V_\phi$ at a high voltage level is supplied to the terminals $t'_1$ and $t'_2$ connected to the second group B of the vertical transfer electrodes, and then a predetermined bias voltage $V_t$ is supplied to the terminal $t_d$ connected to the overflow drain or the diffusion layer 2. Further, the 2-phase driving signals $P_1$ and $P_2$ are supplied only to the terminals $S_1$ and $S_2$ connected to the first group a of the horizontal transfer electrodes and a DC bias voltage $V'_\phi$ at a relatively high voltage level is supplied to the terminals $S'_1$ and $S'_2$ connected to the second group b of the horizontal transfer electrodes, and then a pedetermined bias voltage $V_s$ is supplied to the terminal $S_d$ connected to the diffusion layer 4. The image sensing operation is conducted under the above mentioned condition. In this case, only a signal charge produced in each of the rows of sensing elements positioned under the first group A of the vertical transfer electrodes due to receiving the light applied on the sensing element forming portion 1 is transferred in the vertical direction toward the line transfer portion 3 as indicated by the arrow V by the first group A of the vertical transfer electrodes and a signal charge produced in each of the rows of sensing elements positioned under the second group B of the vertical transfer electrodes is collected in the overflow drain or the diffusion layer 2 and is removed. Then, only the signal charge transferred row by row to a portion of the line transfer portion 3 placed under the first group a of the horizontal transfer electrodes is transferred in the direction toward the output portion 5 as indicated by the arrow H by the first group a of the horizontal transfer electrodes and the signal charge transferred to a portion of the line transfer portion 3 placed under the second group b of the horizontal transfer electrodes is collected in the diffusion layer 4 and is removed. Accordingly, in this second case, the sensing elements which belong to the rows of sensing elements positioned under the first group A of the vertical transfer electrodes and which are mounted on the left side of an elongated boundary line (a broken line in the FIGURE) between the first and second groups a and b of the horizontal transfer electrodes, in other words, the sensing elements placed in an area A' are operative to be effective sensing elements for producing the output video signal.

As mentioned above, in the solid state image sensor according to the present invention, the number of the effective sensing elements can be altered such as in the first and second cases aforementioned. For practical use, for example, about 580 rows of sensing elements are arranged in the vertical direction in the sensing element forming portion 1 and about 490 of them are positioned under the first group A of the vertical transfer electrodes. Each of the above rows is formed to contain about 400 sensing elements and about 340 of them are placed on the left side from the elongated boundary line between the first and second groups a and b of the horizontal transfer electrodes. In this case, when all sensing elements in the sensing element forming portion 1 are used as effective sensing elements for performing the image sensing operation, it is possible to obtain as an output video signal a color television signal according to the PAL of SECAM system wherein one frame picture is formed with about 570 horizontal scanning lines, and otherwise, when the sensing elements placed in the area A' in the sensing element forming portion 1 are used as effective sensing elements, it is possible to obtain as an output video signal a color television signal according to the NTSC system wherein one frame picture is formed with about 485 horizontal scanning lines.

Further, in the above mentioned second case, it is also possible to remove the signal charge produced in the outside of the area A' by means of supplying to the terminals $t'_1$ and $t'_2$ connected to the second group B of the vertical transfer electrodes with an appropriate driving signal, in place of the DC bias voltage, for performing the charge transfer toward the overflow drain or the diffusion layer 2 in the direction opposite to the direction of the arrow V and further supplying to the terminals $S'_1$ and $S'_2$ connected to the second group b of the horizontal scanning electrodes with another appropriate driving signal, in place of the DC bias voltage, for performing the charge transfer toward the diffusion layer 4 in the direction opposite to the direction of the arrow H.

As aforementioned, in the solid state image sensor according to the present invention, the number of the effective sensing elements can be easily altered by selecting the manner of supplying the driving signals to the vertical and horizontal transfer electrodes. Accordingly, it is possible to create with the device, a, solid state image sensor, according to the present invention a novel color television camera which can produce selectively either one for the color television signals of the NTSC system and PAL or SECAM system. While, it is also possible to manufacture separately each of the devices according to the present invention suitable for the NTSC system and the PAL or SECAM system, respectively, by changing the manner of connection of the transfer electrodes thereof during the manufacturing process. Further, in case that there are constructional defects at the outside of the above mentioned area A' in the sensing element forming portion 1 of the device according to the present invention, such a device can be used for producing, for example, the color television signal according to the NTSC system by utilizing only the sensing elements in the area A', so that devices rejected as with inferior quality can be reduced and therefore an improved yield rate can be maintained during manufacturing of the device according to the present invention.

In addition, although the 2-phase CCD is employed in the embodiment explained above, a 3-phase CCD or a 4-phase CCD can be also employed for the device according to the present invention, and further although the embodiment explained above is formed into the interline transfer type, it is possible to form the device according to the present invention into the frame transfer type.

What we claim is:

1. A solid state image sensor comprising; a sensing element forming portion comprising a charge transfer device wherein a number of sensing elements are formed for producing, storing and transferring vertically a signal charge and divided into a first area A' which contains a sufficient number of sensing elements for a first television format and second and third smaller rectangular areas contiguous to said first area on adjacent sides thereof and wherein said first, second and third areas contain a sufficient number of sensing elements for a second television format; a line transfer portion provided at one end of said sensing element forming portion and composed of a charge transfer device for transferring horizontally the signal charge transferred from said sensing element forming portion; vertical transfer electrodes provided on said sensing element forming portion for performing the vertical transfer of the signal charge in said sensing element forming portion, said vertical transfer electrodes being divided into first and second groups arranged in the direction of the vertical transfer of the signal charge so as to be supplied with separate driving and/or biasing signals, respectively; with said first group connected to said first and third areas and said second group connected to said second area, horizontal transfer electrodes provided on said line transfer portion for performing the horizontal transfer of the signal charge in said line transfer portion, said horizontal transfer electrodes being divided into another first $S_1$, $S_2$ and second $S_1'$, $S_2'$ groups arranged in the direction of the horizontal transfer of the signal charge so as to be supplied with another separate driving and/or biasing signals, respectively; and said first group connected to portions of said line transfer portion adjacent said first area and said second group connected to portions of said line transfer portion adjacent said third area, and an output portion provided at one end of said line transfer portion for receiving the signal charge transferred from said line transfer portion and producing an output signal in response to the received signal charge.

2. A solid state image sensor according to claim 1 further comprising a charge absorbing portion provided at the other end of said sensing element forming portion in the side opposite to said line transfer portion, whereinto the signal charge produced in the sensing elements placed under said second group of the vertical transfer electrodes is collected to be removed.

3. A solid state image sensor according to claim 2 further comprising an additional charge absorbing portion provided at the other end of said line transfer portion in the side opposite to said output portion, whereinto the signal charge transferred from said sensing element forming portion to a portion of said line transfer portion placed under said second group of the horizontal transfer electrodes is collected to be removed.

* * * * *